(12) United States Patent
Pfaff

(10) Patent No.: US 7,712,822 B2
(45) Date of Patent: May 11, 2010

(54) FOLDABLE CAB EXTENDER FOR A TRACTOR-TRAILER TRUCK

(76) Inventor: Raimund Pfaff, 2730 N. Fifth St., Carter Lake, IA (US) 51510

( * ) Notice: Subject to any disclaimer, the term of this patent is extended or adjusted under 35 U.S.C. 154(b) by 0 days.

(21) Appl. No.: 12/284,367

(22) Filed: Sep. 22, 2008

(65) Prior Publication Data

US 2010/0072779 A1    Mar. 25, 2010

(51) Int. Cl.
*B62D 35/00* (2006.01)
(52) U.S. Cl. .................... 296/180.2; 296/180.5
(58) Field of Classification Search ... 296/180.1–180.5, 296/181.5; 180/903
See application file for complete search history.

(56) References Cited

U.S. PATENT DOCUMENTS

| | | | | |
|---|---|---|---|---|
| 4,311,334 A | * | 1/1982 | Jenkins | 296/180.4 |
| 4,775,179 A | * | 10/1988 | Riggs | 296/180.2 |
| 4,904,015 A | * | 2/1990 | Haines | 296/180.3 |
| 5,078,448 A | * | 1/1992 | Selzer et al. | 296/180.2 |
| 5,536,062 A | * | 7/1996 | Spears | 296/180.3 |
| 5,595,419 A | * | 1/1997 | Spears | 296/180.2 |
| 5,658,038 A | * | 8/1997 | Griffin | 296/180.2 |
| 6,846,035 B2 | * | 1/2005 | Wong et al. | 296/180.1 |
| 6,886,882 B2 | * | 5/2005 | Farlow et al. | 296/180.4 |
| 6,932,419 B1 | * | 8/2005 | McCullough | 296/180.1 |
| 7,374,229 B1 | * | 5/2008 | Noll et al. | 296/180.2 |
| 2004/0075298 A1 | * | 4/2004 | Wong et al. | 296/180.2 |
| 2007/0200390 A1 | * | 8/2007 | Lotarev et al. | 296/180.2 |

* cited by examiner

*Primary Examiner*—Glenn Dayoan
*Assistant Examiner*—Gregory Blankenship
(74) *Attorney, Agent, or Firm*—Dennis L. Thomte; Thomte Patent Law Office, LLC

(57) ABSTRACT

Foldable cab extenders are disclosed which are secured to the rearward ends of fixed cab extenders secured to the opposite rearward sides of a tractor cab. Each of the foldable cab extenders includes a forward panel member, an intermediate panel member and a rearward panel member with the forward panel member being secured to the associated fixed cab extender and with the intermediate panel member and the forward panel member being hingedly secured together and with the rearward panel member being hingedly secured to the intermediate panel member. The cab assemblies are selectively movable between a deployed position to a stowed position and vice versa. Actuators are operatively connected to the intermediate panel members and to the rearward panel members to enable the assemblies to be pivotally moved between their stowed and deployed positions. The actuators may be hydraulic or pneumatic cylinders or electrically driven devices.

2 Claims, 6 Drawing Sheets

FOLDABLE CAB EXTENDER FOR A TRACTOR-TRAILER TRUCK

BACKGROUND OF THE INVENTION

1. Field of the Invention

This invention relates to a cab extender for a tractor-trailer truck and more particularly to a foldable cab extender which is secured to the rearward end of a fixed cab extender at the opposite rearward sides of the tractor cab. Even more particularly, the invention relates to a foldable cab extender assembly which is selectively movable between a deployed position and a folded stowed position.

2. Description of the Related Art

In a tractor-trailer truck, the forward end of a trailer is coupled to a fifth wheel mechanism at the rearward end of the tractor. A substantial gap in the range of 30 to 48 inches exists between the rear of the tractor cab and the front of the trailer. The gap causes a large drag on the truck, thereby greatly reducing the fuel economy thereof. In the prior art, fixed cab extenders are secured to the opposite rearward sides of the tractor cab and extend partially towards the trailer. In some cases, the fixed cab extenders extend rearwardly toward the trailer and in some cases the fixed cab extenders extend rearwardly and outwardly from the rear of the cab. Although the fixed cab extenders do reduce the gap distance between the rear of the tractor cab and the front of the trailer, the fixed cab extenders cannot extend the entire gap do to the fact that some allowance must be made between the rearward ends of the fixed cab extenders and the trailer so that the tractor may be turned relative to the trailer. The clearance between the rearward end of the cab extenders and the front of the trailer is further complicated if a refrigeration unit is mounted on the front end of the trailer.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A first foldable cab extender assembly is secured to a first fixed cab extender secured to the rearward end of a tractor cab at one side thereof. A second foldable cab extender assembly is secured to a second fixed cab extender secured to the other side of the tractor cab at the rearward end thereof. Each of the foldable cab assemblies includes a forward panel member, an intermediate panel member and a rearward panel member. In each of the foldable cab assemblies the inner rearward end of the forward panel member is hingedly secured to the inner forward end of the intermediate panel member and the outer rearward end of the intermediate panel member and the outer rearward end of the intermediate panel member is hingedly secured to the outer forward end of the rearward panel member. Actuators such as hydraulic or pneumatic cylinders or electrically operated devices are connected to the rearward panel member and to the intermediate panel member so that the cab extender assembly may be hingedly moved from a deployed position wherein the panel members are aligned and extend at least rearwardly from the rear end of the associated fixed cab extender to a folded stowed position wherein the intermediate panel member and the rearward panel member are positioned closely adjacent the inside surface of the forward panel member in a generally parallel relationship with respect to one another.

If pneumatic cylinders are used, a pneumatic valve is provided which is in communication with a source of air under pressure on the truck and is designed to extend and retract the pneumatic cylinders operatively connected to the intermediate and rearward panel members. The valve is controlled by a manual switch or a speed sensor. The speed sensor will cause the valve to extend the pneumatic cylinders, when the foldable cab extenders are in their folded stowed position, to a deployed position upon the truck speed reaching a predetermined speed. The speed sensor also causes the foldable cab extender assemblies to be moved from their deployed positions to their stowed positions when the truck slows to a predetermined speed to enable the truck to be maneuvered or turned with respect to the trailer.

A principal object of the invention is to provide a foldable cab extender which is positioned at the opposite sides of a tractor-trailer truck cab at the rearward end thereof and which are secured to the rearward ends of fixed cab extenders secured to the tractor cab.

A further object of the invention is to provide a foldable cab extender assembly for a tractor-trailer truck which includes a forward panel member, an intermediate panel member and a rearward panel member with the forward end of the intermediate panel member being hingedly secured to the rearward end of the forward panel member and with the rearward end of the intermediate panel member being hingedly secured to the forward end of the rearward panel member.

Still another object of the invention is to provide foldable cab extender assemblies for a tractor-trailer truck which are deployed upon the truck reaching a predetermined speed and which are folded upon the truck slowing to a predetermined speed.

Yet another object of the invention is to provide a foldable cab extender for a tractor-trailer truck, which when in its folded position, does not interfere with the turning of the tractor with respect to the trailer.

Still another object of the invention is to provide a foldable cab extender for a tractor-trailer truck which greatly reduces the gap between the rearward end of fixed cab extenders mounted on the truck cab and the front end of the trailing trailer even if a refrigeration unit is mounted on the front of the trailer.

Yet another object of the invention is to provide a foldable cab extender assembly which may be secured to the fixed cab extenders mounted on the tractor cab.

These and other objects will be apparent to those skilled in the art.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DESCRIPTION OF THE PREFERRED EMBODIMENT

Figure 1:
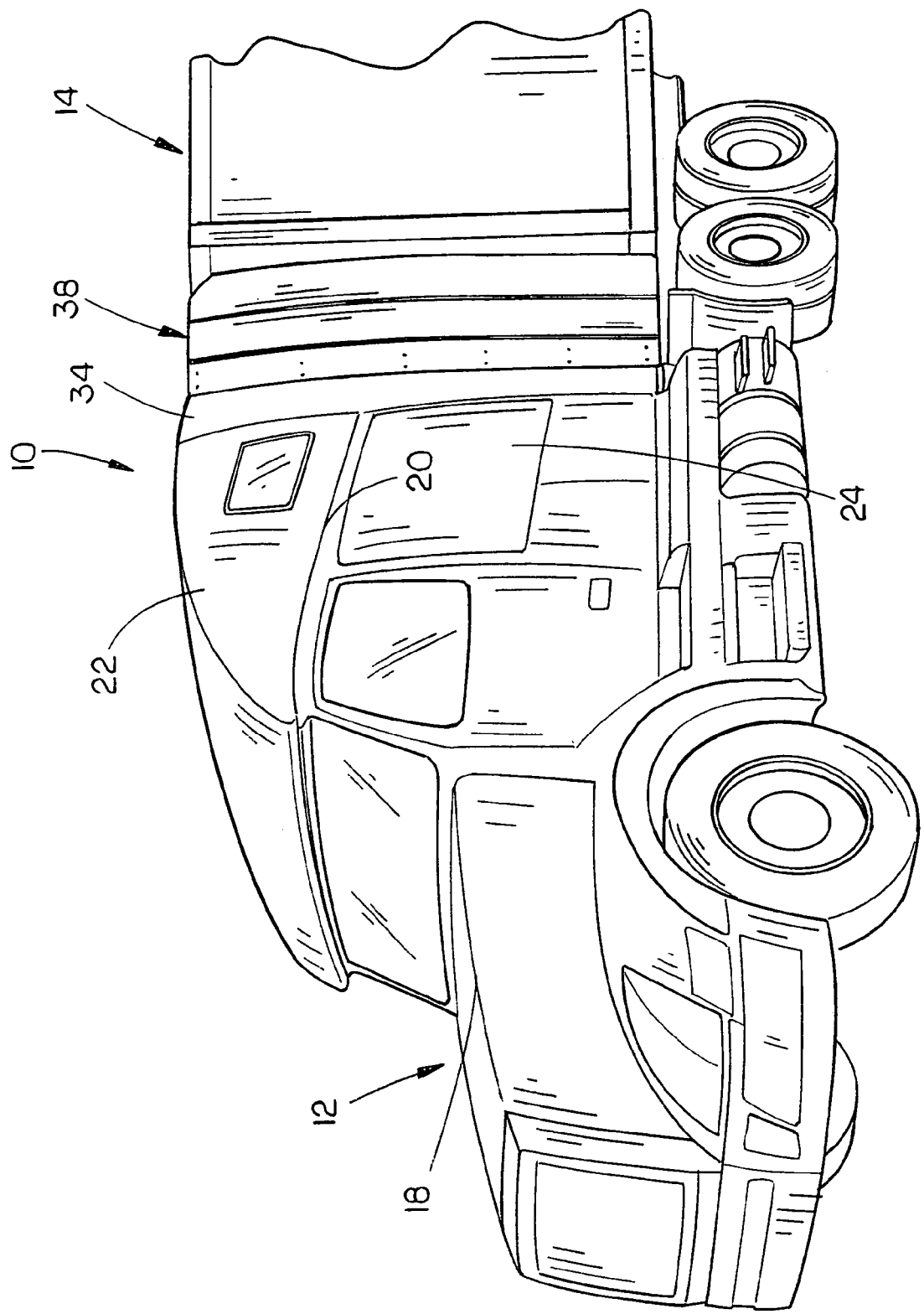
FIG. 1 is a partial front perspective view of a tractor-trailer truck having a foldable cab extender invention secured to the rearward end of a fixed cab extender.
Figure 2:
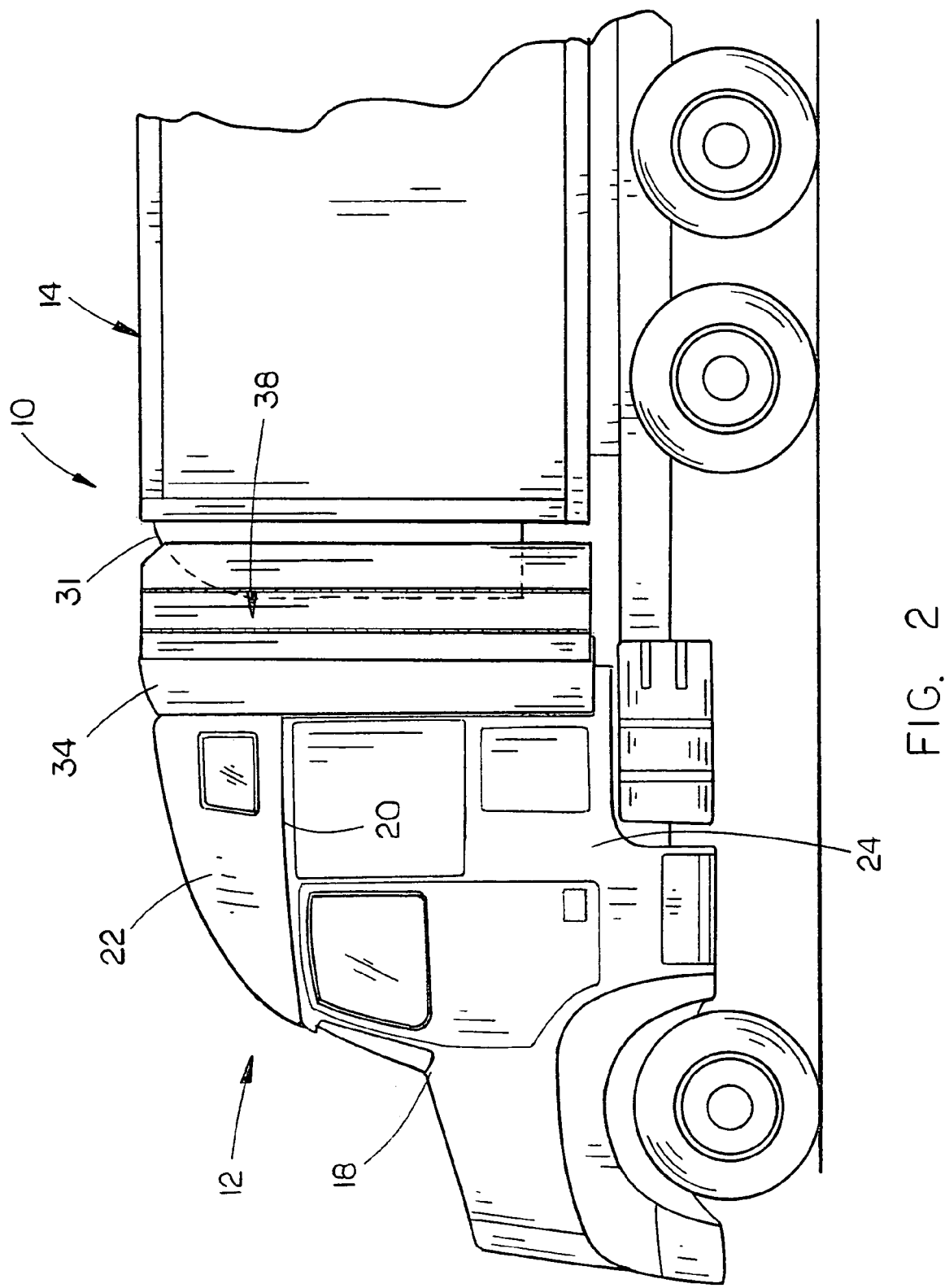
FIG. 2 is a side elevational view of the tractor-trailer truck of FIG. 1.

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

The numeral 10 refers to a conventional tractor/trailer truck including a tractor 12 and a trailer 14 connected to the tractor in conventional fashion by a fifth wheel assembly 16. Tractor 12 includes a cab 18 having a roof 20 upon which a fairing 22 is normally positioned which usually defines the upper end or roof of a sleeper cab 24. The rearward end 26 of cab 18 is positioned forwardly of the front end 28 of trailer 14 to define a gap therebetween which is generally referred to by the reference numeral 30.

Most cabs 18 have cab extenders 32 and 34 secured thereto at the rearward end of the cab at the opposite sides thereof in a fixed manner which usually extend rearwardly from the cab, and normally also extend somewhat outwardly from the cab to partially close the gap 30. In many cases, the front end 28 of the trailer 14 will have a refrigeration unit 31 mounted thereon.

Foldable cab extender assemblies 36 and 38 of this invention are secured to the fixed cab extenders 32 and 34 respectively as will now be described. Cab extender assembly 36 includes a forward panel member 40, intermediate panel member 42 and a rearward panel member 44. For purposes of description, panel member 40 will be described as having an upper end 46, a lower end 48, a forward end 50, a rearward end 52, an inner side 54 and an outer side 56.

For purposes of description, panel member 42 will be described as having an upper end 58, a lower end 60, a forward end 62, a rearward end 64, an inner side 66 and an outer side 68.

Also for purposes of description, panel member 44 will be described as having an upper end 70, a lower end 72, a forward end 74, a rearward end 76, an inner side 78 and an outer side 80.

Figure 3:
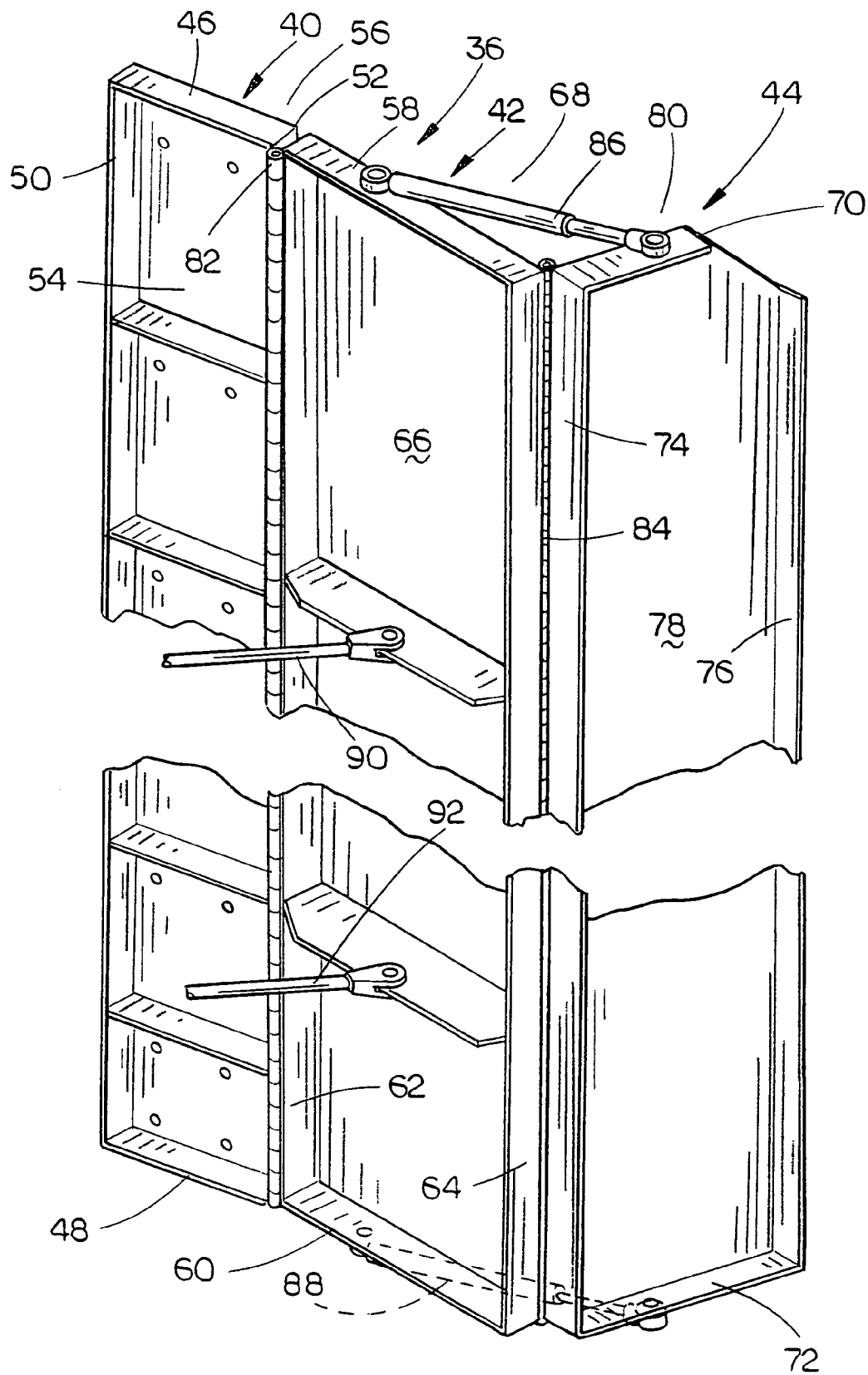
FIG. 3 is a partial perspective view of one of the foldable cab extender assemblies of this invention.
Figure 5:
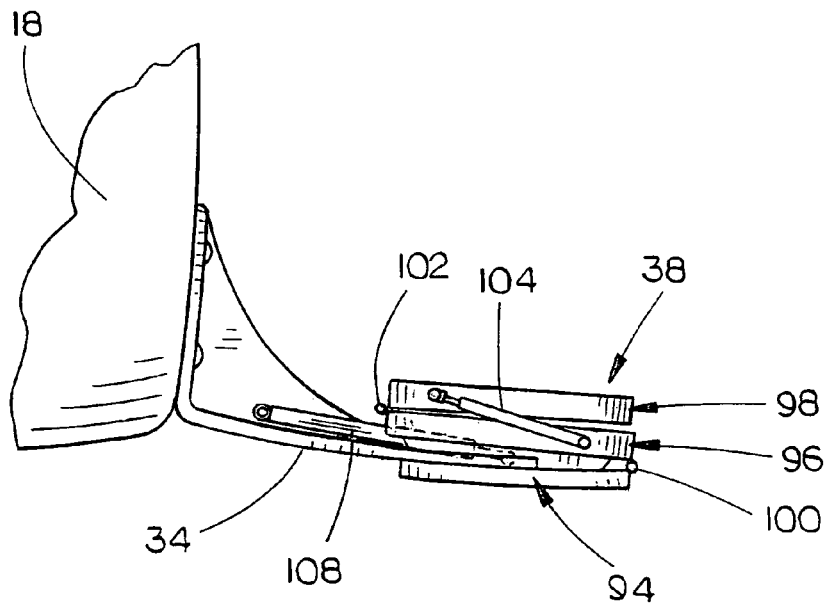
FIG. 5 is a top view of the structure of FIG. 4 with the foldable cab extender assembly being positioned in its stowed position.
Figure 6:
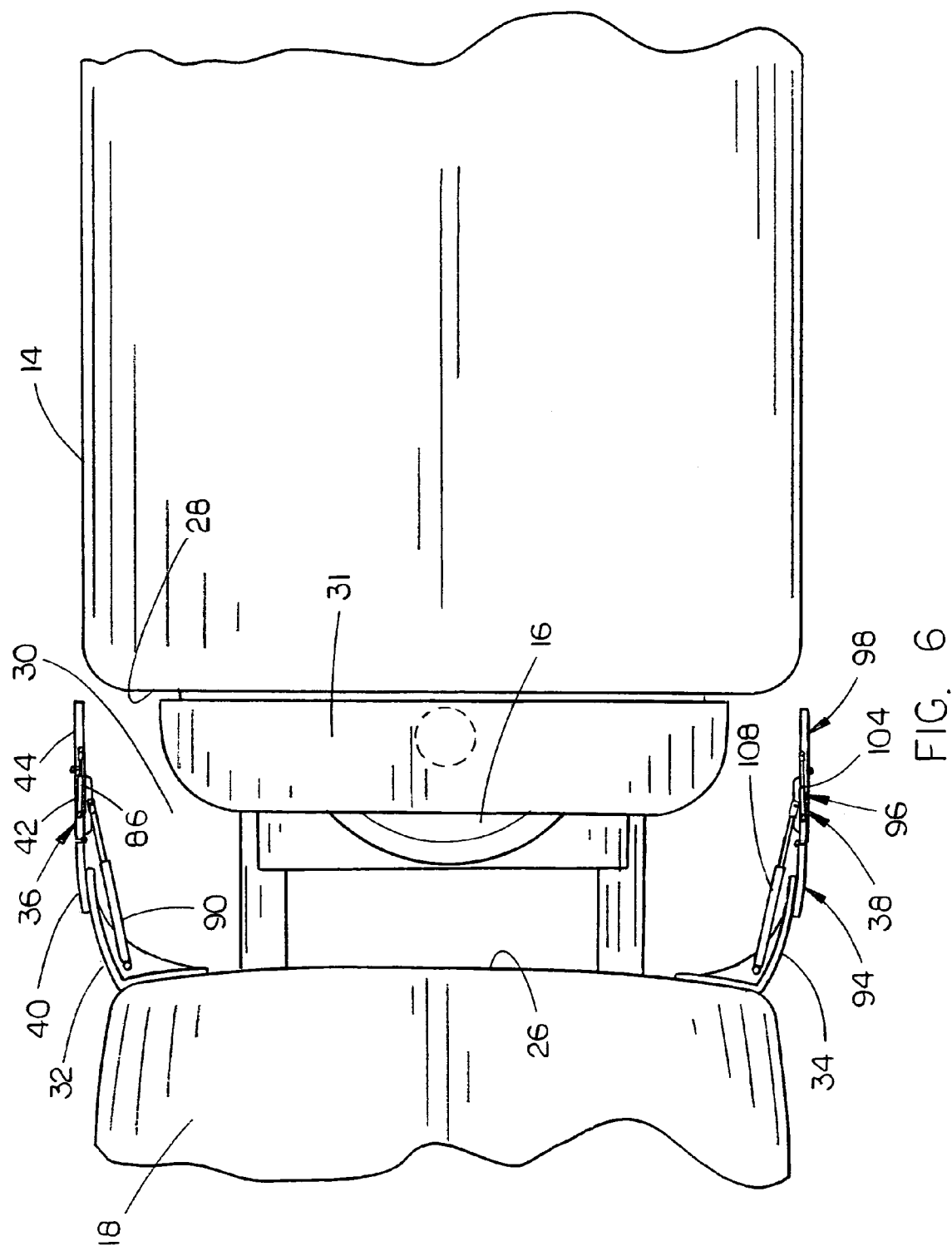
FIG. 6 is a top view illustrating a pair of the foldable cab extender assemblies of this invention secured to the fixed cab extenders of a truck cab with the cab extenders being in their deployed position.

The inner rearward end of panel member 40 is pivotally or hingedly secured to the inner forward end of panel member 42 by hinge 82. The outer rearward end of panel member 42 is pivotally or hingedly secured to the outer forward end of panel member 44 by hinge 84. The forward end of panel member 40 is secured to the fixed cab extender 32 by any convenient means. Actuators such as hydraulic or pneumatic cylinders, or electrically driven devices are utilized to move the cab extender assemblies between their folded and stowed positions. This description will describe pneumatic cylinders as the means for folding the cab extender assemblies. A pair of power cylinders such as pneumatic cylinders 86 and 88 are secured at one end thereof to the upper and lower ends of panel member 42 and are pivotally secured at their other ends to the upper and lower ends of panel member 44 as illustrated in FIG. 3. A pair of power cylinders such as pneumatic cylinders 90 and 92 are pivotally secured at their forward ends to the fixed cab extender 32 or to the cab 18 and are pivotally secured at their rearward ends to panel member 42 between the cylinders 86 and 88 as illustrated in FIG. 3. The cylinders 86, 88, 90 and 92 are of the double acting type and are designed to pivotally and hingedly move the foldable cab extender assembly 36 from its deployed position as illustrated in FIG. 6 to its folded stowed position as illustrated in FIG. 5.

Cab extender assembly 38 is a mirror image of cab extender assembly 36 and includes a forward panel member 94, an intermediate panel member 96 and a rearward panel member 98. The inner rearward end of panel member 94 is pivotally or hingedly secured to the inner forward end of panel member 96 by hinge 100. The outer rearward end of panel member 96 is pivotally or hingedly secured to the outer forward end of panel member 96 by hinge 102. The forward end of panel member 94 is secured to the fixed cab extender 34 by any convenient means.

Figure 4:
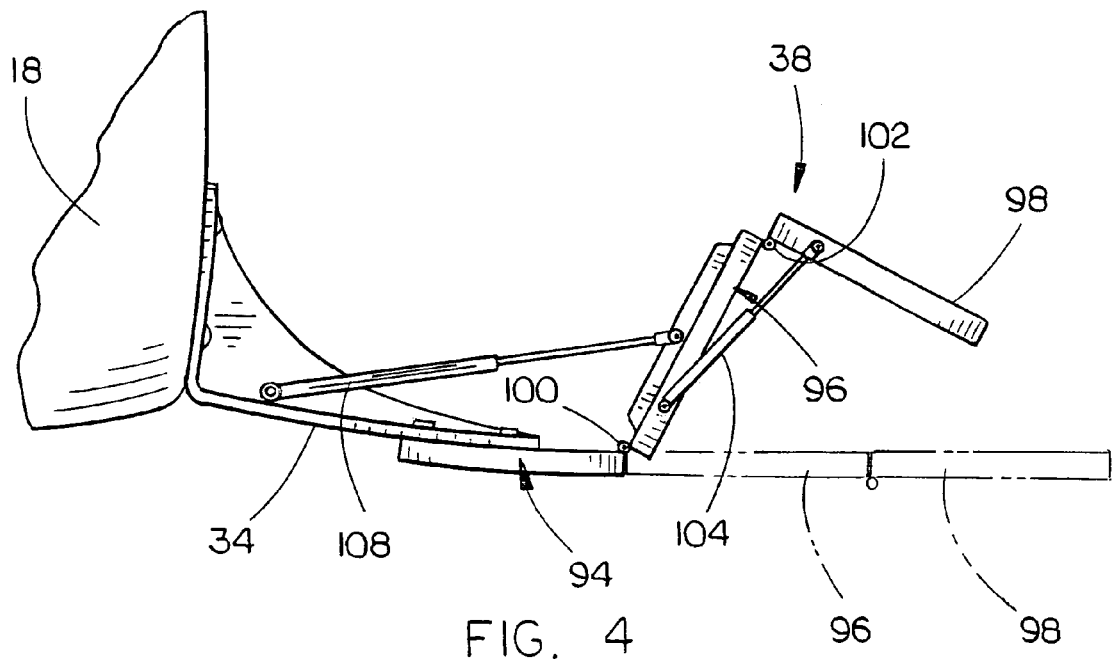
FIG. 4 is a top view of one of the foldable cab extenders of this invention secured to a fixed cab extender mounted at the rearward end of the truck cab at the left side thereof.

A pair of power cylinders such as pneumatic cylinders 104 and 106 are secured at one end thereof to the upper and lower ends of panel member 96 and are pivotally secured at their other ends to the upper and lower ends of panel member 98 in the same fashion that cylinders 86 and 88 are secured to panel members 42 and 44. A pair of power cylinders such as pneumatic cylinders 108 and 110 are pivotally secured at their forward ends to the fixed cab extender 34 or to the cab 18 and are pivotally secured at their rearward ends to panel member 96 between the cylinders 104 and 106 in the same fashion as cylinders 90 and 92 are pivotally secured at their forward ends to the fixed cab extender 32 or cab 18 and are pivotally secured at their rearward ends to panel member 42. The cylinders 104, 106, 108 and 110 are also of the double acting type and are designed to pivotally or hingedly move the foldable cab extender assembly 38 from the deployed position as illustrated by broken lines in FIG. 4 to the folded stowed position of FIG. 5.

Figure 7:
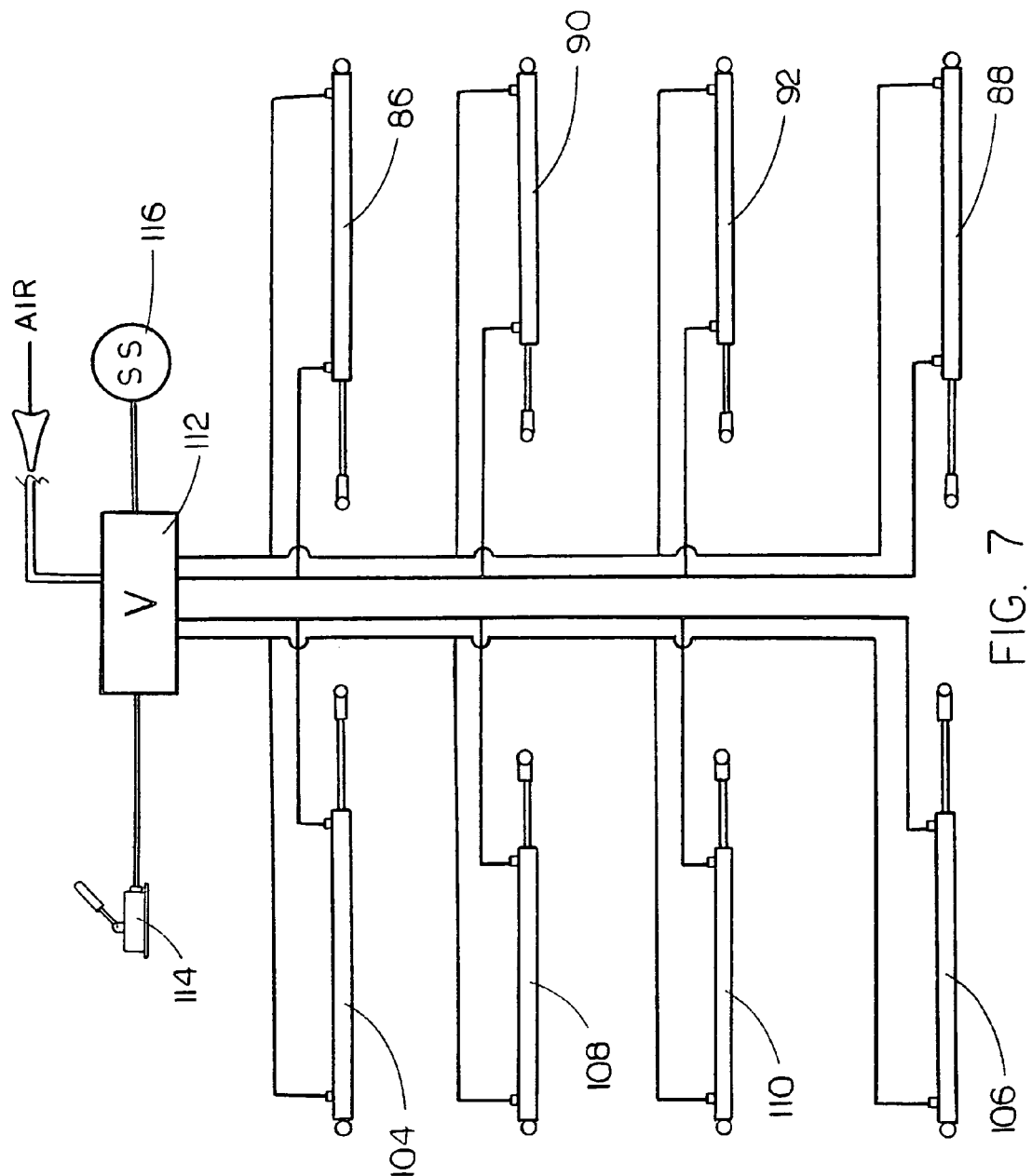
FIG. 7 is a schematic of the circuitry of the pneumatic cylinders which selectively move the cab extender assemblies between their stowed and deployed positions.

As illustrated in the schematic drawing of FIG. 7, the double acting cylinders are connected to a valve 112 which is connected to a source of air under pressure such as the tractor air system. Valve 112 may be controlled by a manual switch 114 to move the foldable cab extender assemblies 36 and 38 between their deployed positions and their folded stowed positions and vice versa. Valve 112 is also preferably controllable by a vehicle speed sensor 116 which senses the speed of the tractor in conventional fashion and which will extend the cylinders 86, 90, 92, 88 and 104, 108, 110 and 116 when the tractor speed reaches a predetermined speed to deploy the cab extender assemblies 36 and 38 and which will retract the cylinders 86, 90, 92, 88 and 104, 108, 110 and 116 when the tractor slows to a predetermined speed to move the cab extender assemblies 36 and 38 to their folded stowed positions.

The unique folding action between the intermediate panel members and the rearward panel member of the cab extender assemblies 36 and 38 ensures that the rearward panel members of the cab extender assemblies 36 and 38 will "clear" the refrigeration unit 31 and will not strike the same. When the foldable cab extender assemblies 36 and 38 are in their deployed position, the gap 30 is significantly closed or reduced to decrease the drag normally created by the gap 30. When the cab extender assemblies 36 and 38 are in their folded stowed position, the tractor 12 may be turned with respect to the trailer 14 without the cab extender assemblies 36 and 38 engaging the frame of the trailer which would damage the cab extender assemblies 36 and 38.

Thus it can be seen that the invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

The invention claimed is:

1. In combination with a tractor-trailer truck with the tractor having a cab with opposite sides and a rearward end which is positioned forwardly of the front end of the trailer so as to define a gap therebetween, comprising:
    a first fixed cab extender secured to the cab at the rearward end of one side thereof which extends at least rearwardly therefrom to partially close the gap between the cab and the trailer at one side of the cab;
    a second fixed cab extender secured to the cab at the rearward end of the other side thereof which extends at least rearwardly therefrom to partially close the gap between the cab and the trailer at the other side of the cab;
    each of said fixed cab extenders having a rearward end;
    a first foldable cab extender assembly having forward and rearward ends and secured to said first fixed cab extender adjacent said rearward end thereof;
    said first foldable cab extender assembly including forward, intermediate and rearward panel members with forward and rearward ends;
    said forward panel member of said first foldable cab extender assembly being fixed to said first fixed cab extender and extending at least rearwardly therefrom;
    said forward end of said intermediate panel member of said first foldable cab extender assembly being pivotally secured to said rearward end of said forward panel member of said first foldable cab extender assembly;
    said forward end of said rearward panel member of said first foldable cab extender assembly being pivotally secured to said rearward end of said intermediate panel member of said first foldable cab extender assembly;
    a second foldable cab extender assembly having forward and rearward ends and secured at its said forward end to said second fixed cab extender adjacent said rearward end thereof;
    said second foldable cab extender assembly including forward, intermediate and rearward panel members with forward and rearward ends;
    said forward panel member of said foldable cab extender assembly being fixed to said second fixed cab extender assembly and extending at least rearwardly therefrom;
    said forward end of said intermediate panel member of said second foldable cab extender assembly being pivotally secured to said rearward end of said forward panel member of said second foldable cab extender assembly;
    said forward end of said rearward panel member of said second foldable cab extender assembly being pivotally secured to said rearward end of said intermediate panel member of said second foldable cab extender assembly;
    each of said first and second cab extender assemblies being movable between a deployed position and a folded stowed position;
    said forward, intermediate and rearward panel members of said first foldable cab extender assembly being positioned closely adjacent one another in a generally parallel manner when said first foldable cab extender assembly is in its said folded stowed position;
    said forward, intermediate and rearward panel members of said second foldable cab extender assembly being positioned closely adjacent one another in a generally parallel manner when said second foldable cab extender assembly is in its said folded stowed position.

2. In combination with a tractor-trailer truck with the tractor having a cab with opposite sides and a rearward end which is positioned forwardly of the front end of the trailer so as to define a gap therebetween, comprising:
    a first fixed cab extender secured to the cab at the rearward end of side thereof which extends at least rearwardly therefrom to partially close the gap between the cab and the trailer at one side of the cab;
    a second fixed cab extender secured to the cab at the rearward end of the other side thereof which extends at least rearwardly therefrom to partially close the gap between the cab and the trailer at the other side of the cab;
    each of said fixed cab extenders having a rearward end;
    a first foldable cab extender assembly having forward and rearward ends and secured to said first fixed cab extender adjacent said rearward end thereof;
    said first foldable cab extender assembly including forward, intermediate and rearward panel members with forward and rearward ends;
    said forward panel member of said first foldable cab extender assembly being fixed to said first fixed cab extender and extending at least rearwardly therefrom;
    said forward end of said intermediate panel member of said first foldable cab extender assembly being pivotally secured to said rearward end of said forward panel member of said first foldable cab extender assembly;
    said forward end of said rearward panel member of said first foldable cab extender assembly being pivotally secured to said rearward end of said intermediate panel member of said first foldable cab extender assembly;
    a second foldable cab extender assembly having forward and rearward ends and secured at its said forward end to said second fixed cab extender adjacent said rearward end thereof;
    said second foldable cab extender assembly including forward, intermediate and rearward panel members with forward and rearward ends;
    said forward panel member of said foldable cab extender assembly being fixed to said second fixed cab extender assembly and extending at least rearwardly therefrom;
    said forward end of said intermediate panel member of said second foldable cab extender assembly being pivotally secured to said rearward end of said forward panel member of said second foldable cab extender assembly;
    said forward end of said rearward panel member of said second foldable cab extender assembly being pivotally secured to said rearward end of said intermediate panel member of said second foldable cab extender assembly;
    each of said first and second cab extender assemblies being movable between a deployed position and a folded stowed position;
    an actuator connected to each of said intermediate and rearward panel members of each of said foldable cab extender assemblies for moving said cab extender assemblies between their folded stowed position and their deployed position;
    at least one of said actuators being pivotally secured to and extending between said intermediate and rearward panel members of each of said foldable cab extender assemblies.

* * * * *